US012073184B1

United States Patent
Suleman et al.

(10) Patent No.: US 12,073,184 B1
(45) Date of Patent: Aug. 27, 2024

(54) ARTIFICIAL INTELLIGENCE DIRECTED CONTROLLED-ENVIRONMENT FACILITY RESIDENT SUPPORT TICKET RESPONSE AND/OR ACTION

(71) Applicant: Securus Technologies, Inc., Carrollton, TX (US)

(72) Inventors: Shuaib Suleman, Plano, TX (US); Adam Christopher Edwards, Fort Worth, TX (US); Brian Huddleston, Wylie, TX (US); Kenneth D. Johnston, Jr., Wylie, TX (US)

(73) Assignee: Securus Technologies, LLC, Plano, TX (US)

( * ) Notice: Subject to any disclaimer, the term of this patent is extended or adjusted under 35 U.S.C. 154(b) by 999 days.

(21) Appl. No.: 16/418,837

(22) Filed: May 21, 2019

(51) Int. Cl.
G06Q 30/016 (2023.01)
G06F 40/30 (2020.01)
G06Q 50/26 (2024.01)
G06N 5/04 (2023.01)

(52) U.S. Cl.
CPC .......... *G06F 40/30* (2020.01); *G06Q 30/016* (2013.01); *G06Q 50/26* (2013.01); *G06N 5/04* (2013.01)

(58) Field of Classification Search
CPC ...... G06F 40/30; G06Q 30/016; G06Q 50/26; G06N 5/04
See application file for complete search history.

(56) References Cited

U.S. PATENT DOCUMENTS 6,859,783 B2 * 2/2005 Cogger ............... G06F 11/0709
    709/223
7,752,159 B2 * 7/2010 Nelken ................. G06F 40/30
    706/62

(Continued)

FOREIGN PATENT DOCUMENTS

CN    1758248 B  *  5/2014  ......... G06F 16/9535

OTHER PUBLICATIONS

Lanyo, "Utilizing extractive text to support customer query" (Year: 2018).*

*Primary Examiner* — Sangeeta Bahl
(74) *Attorney, Agent, or Firm* — Fogarty LLP

(57) ABSTRACT

Artificial intelligence directed controlled-environment facility resident support ticket response and/or action may provide access to a controlled-environment facility media and/or communications terminal or device support application program via one or more controlled-environment facility media and/or communications terminals and/or a plurality of personal controlled-environment facility resident media and/or communications devices, which accept input of a support request, via the support application program, from a controlled-environment facility resident. A controlled-environment facility media and/or communications device services platform receives the request, determines an assigned weight of words in the request and selects one or more passages of predefined response text to compose a response to the request, based on a determined weight of words in the request and tags associated with these words and the passage(s) of predefined text. The platform personalizes the response, based on identification of the resident, and sends the resulting personalized response to the respective terminal or device.

18 Claims, 4 Drawing Sheets

(56) References Cited

U.S. PATENT DOCUMENTS

| | | | | |
|---|---|---|---|---|
| 7,860,722 | B1* | 12/2010 | Chow | H04M 3/2281 |
| | | | | 379/88.04 |
| 8,082,151 | B2* | 12/2011 | Bangalore | G06F 40/30 |
| | | | | 704/251 |
| 10,394,900 | B1* | 8/2019 | Edwards | G06F 16/951 |
| 10,498,898 | B2* | 12/2019 | Mazza | G10L 15/26 |
| 2015/0163358 | A1* | 6/2015 | Klemm | G06Q 30/01 |
| | | | | 379/88.01 |
| 2015/0178392 | A1* | 6/2015 | Jockisch | G06F 16/9535 |
| | | | | 707/706 |
| 2016/0063126 | A1* | 3/2016 | Nelken | G06F 16/3329 |
| | | | | 707/726 |
| 2016/0232303 | A1* | 8/2016 | Amit | G06F 16/243 |
| 2017/0353404 | A1* | 12/2017 | Hodge | H04L 67/02 |
| 2018/0260384 | A1* | 9/2018 | Pasupalak | G06F 40/40 |
| 2019/0180196 | A1* | 6/2019 | Terry | G06F 40/56 |

\* cited by examiner

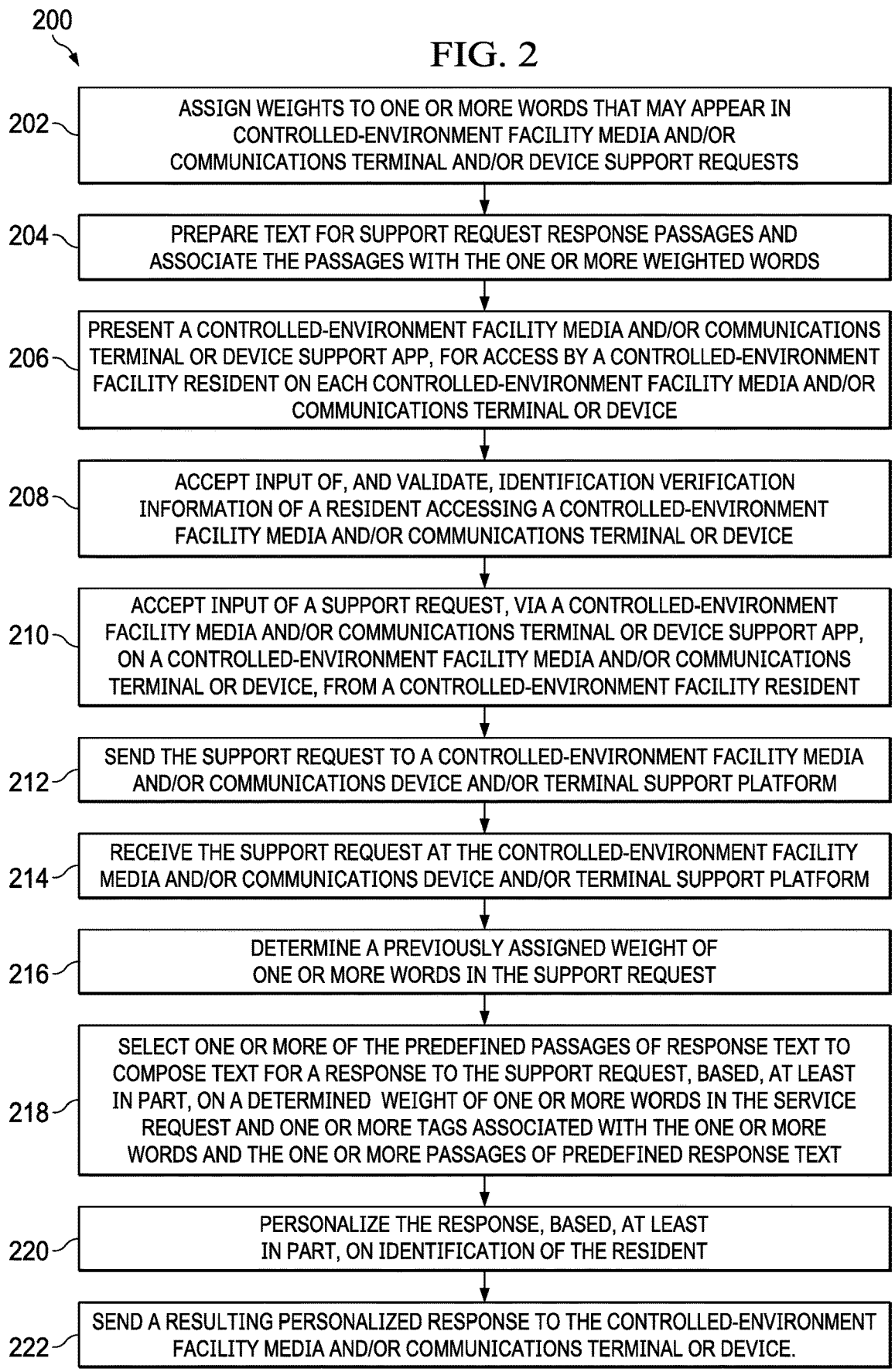

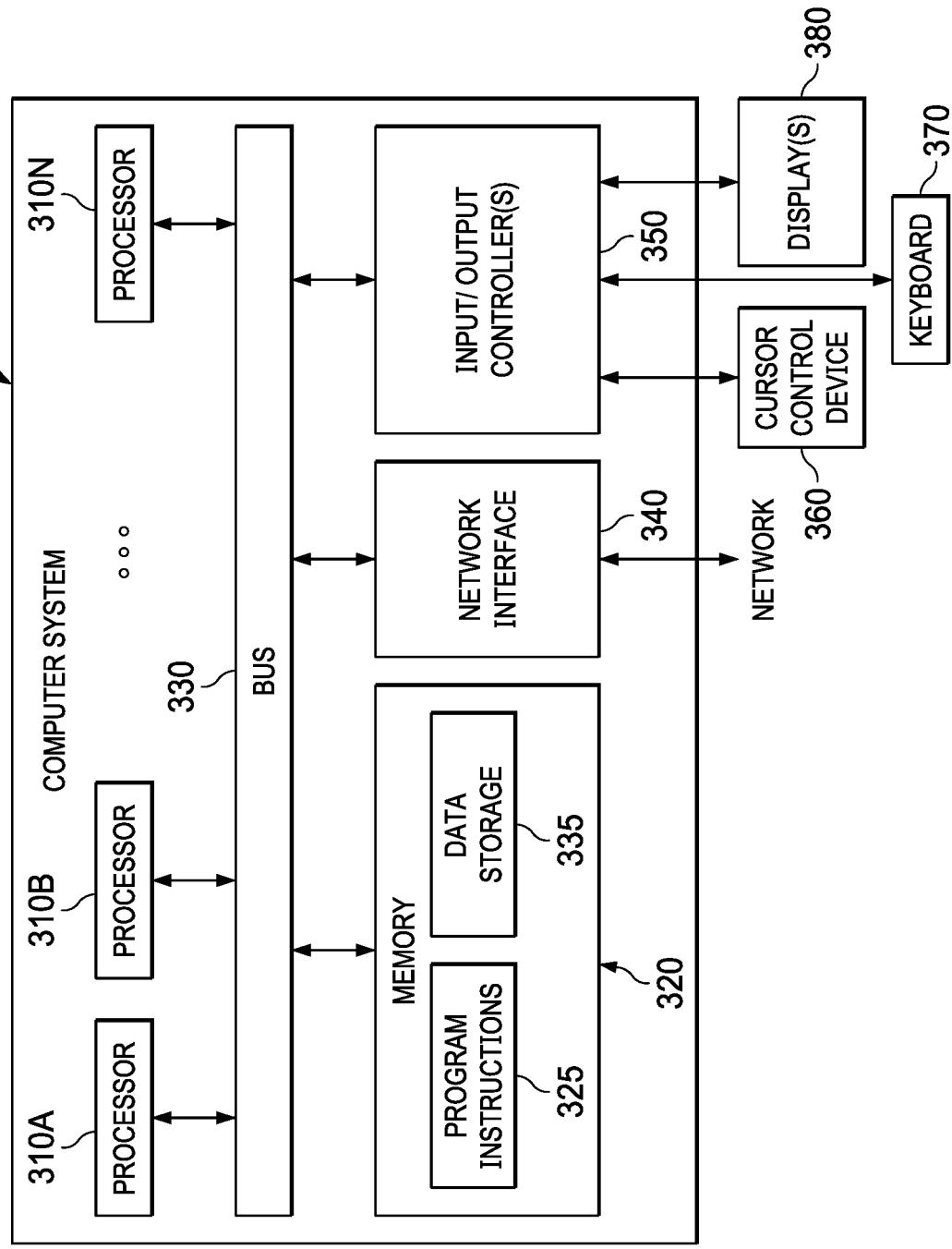

ARTIFICIAL INTELLIGENCE DIRECTED CONTROLLED-ENVIRONMENT FACILITY RESIDENT SUPPORT TICKET RESPONSE AND/OR ACTION

TECHNICAL FIELD

The present disclosure relates generally to controlled-environment facilities, more particularly to support requests by controlled-environment facility residents, and specifically to artificial intelligence directed controlled-environment facility resident support ticket response and/or action.

BACKGROUND

According to the International Centre for Prison Studies, the United States has the highest prison population per capita in the world. In 2009, for example, 1 out of every 135 U.S. residents was incarcerated. Generally, inmates convicted of felony offenses serve long sentences in prison (e.g., federal or state prisons), whereas those convicted of misdemeanors receive shorter sentences to be served in jail (e.g., county jail). In either case, while awaiting trial, a suspect or accused may remain incarcerated. During his or her incarceration, an inmate may have opportunities to communicate with the outside world.

By allowing prisoners to have some contact with friends and family while incarcerated, the justice system aims to facilitate their transition back into society upon release. Traditional forms of contact include telephone calls, in-person visitation, conjugal visits, etc. More recently, technological advances have allowed jails and prisons to provide other types of visitation, including individual-to-individual videoconferences, which may be typically referred to as "video visitation," and online chat sessions.

Traditional communication services provided residents of controlled-environment facilities (such as correctional facilities) include allowing residents (inmates) to place outbound phone calls to non-residents of the controlled-environment facility. Additionally, non-residents can typically schedule video visitation with residents (inmates) of the controlled-environment facility. Other types of communication available to controlled-environment residents include the ability to exchange email and canned text messages between residents and non-residents of the controlled-environment facility. Basically, all of these forms of communication aim to facilitate communication between a resident of a controlled-environment facility and a non-resident.

Additionally, over the past several years, the above-mentioned sharp increase in the U.S. inmate population has not been followed by a proportional increase in the number of prison or jail staff. To the contrary, budget pressures in local, state, and federal governments have made it difficult for correctional facilities to maintain an adequate number of wardens, officers, and other administration personnel. Hence, many correctional facilities are often unable to provide inmate support, with respect to communications, or the like.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present invention is directed to systems and methods which provide artificial intelligence directed controlled-environment facility resident support ticket response and/or action by providing, via a controlled-environment facility media and/or communications terminal or device, access to a controlled-environment facility media and/or communications terminal or device support application program, which accepts input of a support request, via the support application program, from a controlled-environment facility resident accessing a respective controlled-environment facility media and/or communications terminal or device. Embodiments of the present systems and methods may require and accept input of controlled-environment facility resident identification verification information, and may validate the controlled-environment facility resident identification verification information prior to providing access to the controlled-environment facility media and/or communications terminal or device support application program. The support request may be with respect to the controlled-environment facility media and/or communications terminal or device that the resident is accessing or another controlled-environment facility media and/or communications terminal or device.

A controlled-environment facility media and/or communications device services platform receives the support request, determines a previously assigned weight of one or more words in the support request. Program instructions of the controlled-environment facility media and/or communications device services platform may include a natural language process and natural language generation algorithm and determining the previously assigned weight of one or more words in the support request further may include receiving and passing the support request through the natural language process and/or natural language generation algorithm(s). The controlled-environment facility media and/or communications device services platform selects, based, at least in part, on a determined weight of one or more words in the support request, one or more passages of predefined response text associated with one or more tags associated with the one or more words, to compose a response to the support request. The controlled-environment facility media and/or communications device services platform also personalizes the response, based, at least in part, on identification of the resident and sends a resulting personalized response to the respective controlled-environment facility media and/or communications terminal or device. Personalizing the response based on identification of the resident may employ the natural language process and/or natural language generation algorithm(s) and/or may include drawing information about the resident from a controlled-environment facility administration and management system using the identification information of the resident.

Input of the support request may be facilitated by presenting, via the controlled-environment facility media and/or communications terminal or device support application program, a search box. In such cases determination of the previously assigned weight of one or more words in the support request may be carried out on words entered in the search box. Additionally, or alternatively, input of the support request may be facilitated by presenting, via the controlled-environment facility media and/or communications terminal or device support application program, a chat bot box. In such embodiments, determination of the previously assigned weight of one or more words in the support request may be carried out on words entered in the chat bot box.

Additionally, alternatively, and/or subsequently acceptance of input of the support request may include presenting an option to open a support ticket with respect to the controlled-environment facility media and/or communications terminal or device that the resident is accessing or another personal controlled-environment facility resident media and/or communications device associated with the resident, via the controlled-environment facility media and/or communications terminal or device support application program.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, one or more systems may each include at least one processor and memory coupled to the processor(s), wherein the memory is configured to store program instructions executable by the processor(s) to cause the system(s) to execute one or more operations disclosed herein.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Figure 1A:
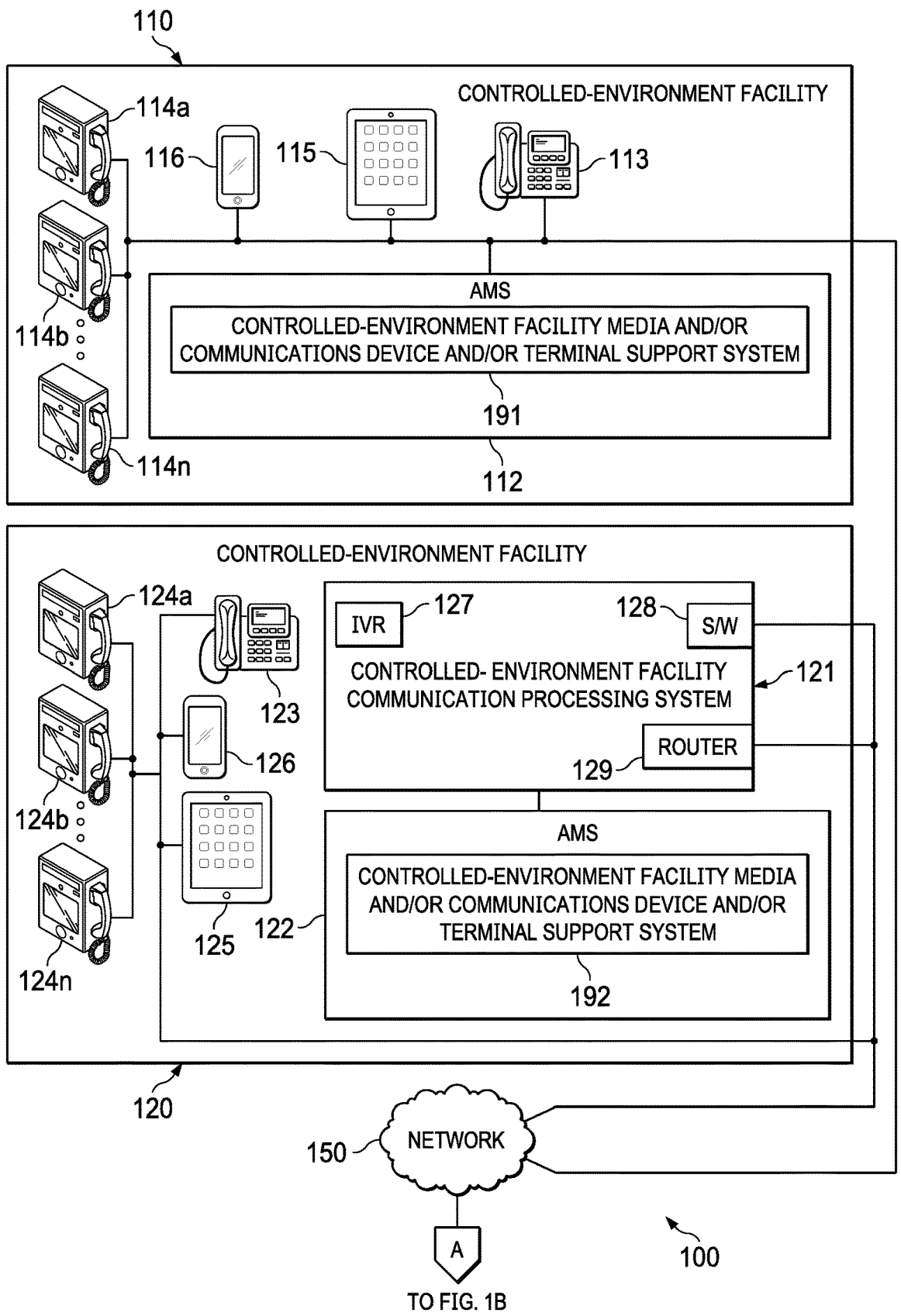
Figure 1B:
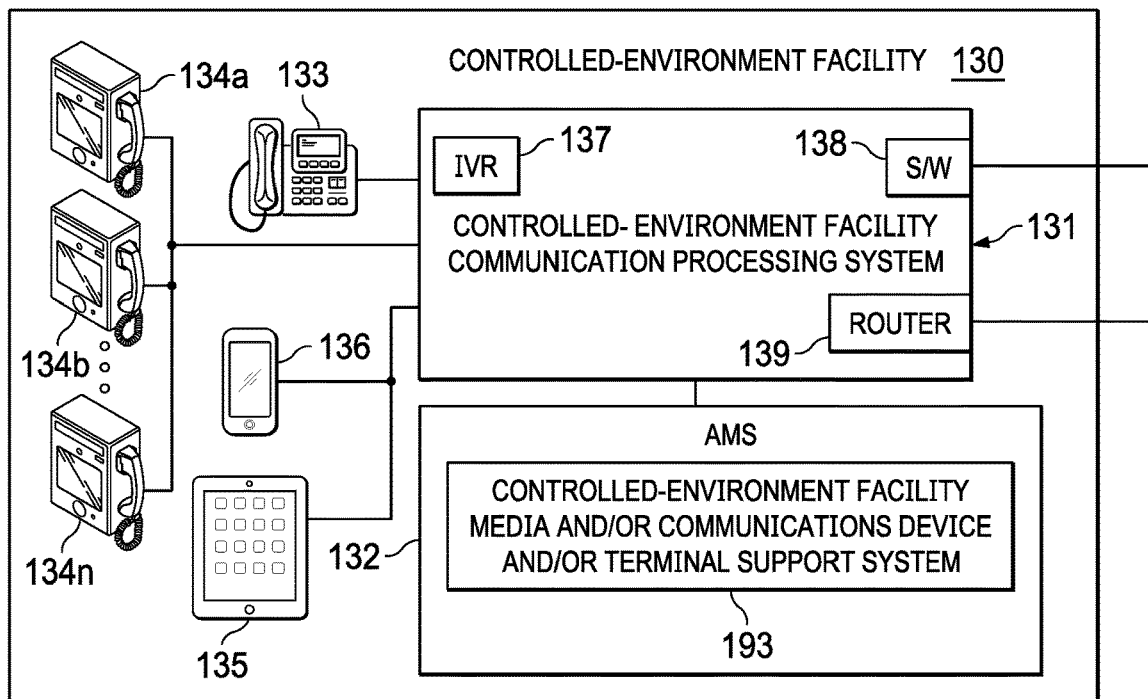

Having thus described the invention in general terms, reference will now be made to the accompanying drawings, which are not necessarily drawn to scale, and wherein:

FIGS. 1A and 1B are partial views intended to form a diagrammatic illustration of an example communications environment, wherein an example embodiment of the present systems and methods for artificial intelligence directed controlled-environment facility resident support ticket response and/or action may be deployed in conjunction with a single, or multiple, controlled-environment facilities, according to some embodiments;

FIG. 2 is a flowchart of an example process for artificial intelligence directed controlled-environment facility resident support ticket response and/or action, in accordance with some embodiments; and FIG. 3 is a block diagram of a computer system, device, station, or terminal configured to implement various techniques disclosed herein, according to some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

For example, various types of controlled-environment facilities are present in today's society, and persons may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, dormitories, barracks, etc.), and the like. For convenience of explanation, various examples discussed herein are presented in the context of correctional facilities, or the like. For instance, in some of the embodiments discussed below, a controlled-environment facility may be referred to as a correctional facility, jail or prison, and its residents may be referred to as inmates, arrestees, or detainees. It should be understood, however, that the systems and methods described herein may be similarly applicable to other types of controlled-environment facilities and their respective residents (e.g., a hospital and its patients, a school dormitory and its students, etc.).

As noted above, it may be desirable to allow prisoners, or other controlled-environment facility residents, to have some contact with friends and family while incarcerated or otherwise detained. To such ends controlled-environment facility residents (inmates) may be provided access to communal controlled-environment facility media and/or communications terminals and/or be provided personal controlled-environment facility resident media and/or communications devices, for communication with outside parties (non-residents) and/or for consuming media content, such as music, movies, games, internet access, or the like. However, for budgetary, staffing or similar reasons, many correctional facilities (or other controlled-environment facilities) are often unable to provide inmates (residents) (sufficient) support with respect to controlled-environment facility media and/or communications terminal or device hardware, software or use issues, or the like. Additionally, many facilities are not able to support inmates with respect to controlled-environment facility media and/or communications terminal or device hardware, software or use issues, or the like, due to lack of information or data needed to provide such support.

Some current inmate ticketing systems allow an inmate to submit a ticket under certain subtopics to document an issue with software or hardware of a controlled-environment facility communications and/or media device. Hence, embodiments of the present systems and methods relate generally to controlled-environment facilities, but more particularly, to support requests by controlled-environment facility residents, and specifically to artificial intelligence directed controlled-environment facility resident support ticket responses and/or actions. The present artificial intelligence directed controlled-environment facility resident support ticket response and/or action systems and processes, and related workflows, reduce time, effort, and energy currently being utilized and provide automated responses where applicable, oversight and access to bulk resolutions, as well as better, more advanced, operational functionality and Internal/Inmate Support Agent (ISA) usage to mitigate and remedy controlled-environment facility resident support issues. To wit, embodiments of the present systems and methods, provide artificial intelligence directed controlled-environment facility resident support ticket response and/or action, which through access to a controlled-environment facility media and/or communications terminal or device support application program via one or more controlled-environment facility media and/or communications terminals and/or a plurality of personal controlled-environment facility resident media and/or communications devices, accept input of a support request, via the support application program, from a controlled-environment facility resident. A controlled-environment facility media and/or communications device services platform receives the request, determines an assigned weight of words in the request and selects one or more passages of predefined response text to compose a response to the request, based on a determined weight of words in the request and tags associated with these words and the passage(s) of predefined text. The platform personalizes the response, based on identification of the resident, and sends the resulting personalized response to the respective terminal or device.

The present artificial intelligence directed controlled-environment facility resident support ticket response and/or action systems and methods focus on implementing automated response functionally and other new features to better capture, process, and resolve ticket submissions by controlled-environment facility residents. That is, embodiments of the present artificial intelligence directed controlled-environment facility resident support ticket response and/or action systems and methods enhance existing process and provide a method to capture, process, and resolve controlled-environment facility resident tickets received through controlled-environment facility communication and media kiosks, as well as personal controlled-environment facility resident communications and/or media devices.

Embodiments of the present systems and methods direct support through an artificial intelligence interface to provide responses and/or take action to individual complaints, support request or the like from controlled-environment facility residents, with respect to communal and/or personal controlled-environment facility communication and/or media device hardware and/or software operation. The present systems and methods for artificial intelligence directed controlled-environment facility resident support ticket response and/or action analyze an inmate (controlled-environment facility resident) communication directed to specific support issue, passing through a Natural Language Process (NLP) and Natural Language Generation (NLG) algorithm, to decipher the question asked and respond with natural enactment similar to what might be provided by a live resident support agent.

NLP and NLG are used in the field of machine learning to understand text, with its varying structure, implied meanings, sentiments, and intent. Phases of NLP may involve lexical (structure) analysis, parsing, semantic analysis, discourse integration, and pragmatic analysis. NLP training may employ examples of text (e.g., words, sentences, and paragraphs) written by humans to gain an understanding of "context" of written text. NLG may employ NLP results to convert data into natural "sounding" text, (e.g., into text the way it is spoken or written by a human). Once NLP unlocks context of data through the use of text-analytics features such as entity recognition, concept extraction, text classification, sentiment analysis, and relation extraction or parsing, NLG may sort through variables and deliver natural-sounding sentences and paragraphs that observe the rules of grammar.

By employing personal and consumable data available to the artificial intelligence directed controlled-environment facility resident support ticket response and/or action systems and methods, the resident receives a natural, personalized, and actionable response to their support issue. Embodiments of the present artificial intelligence directed controlled-environment facility resident support ticket response and/or action systems and methods manage predetermined ("canned") message responses, to be delivered in such a way, that personalization is automated. For example, information maintained by the controlled-environment facility and/or the controlled-environment facility service provider is applied to the reply message without a resident service agent editing the response. Upon the message being delivered, the service ticket may be closed. However, to maintain a pending status for the resident ticket, the resident service agent may select an option that requires further action on the ticket, such as "Inmate Information Requested," or the like.

FIGS. 1A and 1B are partial views intended to form a diagrammatic illustration of example controlled-environment facility communications environment 100, wherein example embodiments of the present systems and methods for artificial intelligence directed controlled-environment facility resident support ticket response and/or action may be employed, for example with respect to multiple controlled-environment facilities 110, 120, etc., and/or a single controlled-environment facility (130), according to some embodiments. Therein, onsite communication processing system 121, 131, external centralized communication processing system 141, such as may be deployed in a controlled-environment facility communications provider data center (140), or the like, may provide telephone services, videoconferencing, online chat, and other communication services to residents of respective controlled-environment facility 110, 120, 130, etc. As illustrated, in some cases, a communication processing system (121, 131,) may be co-located with a controlled-environment facility (120, 130, respectively). Alternatively, as also illustrated, a communication processing system (141) may be centrally or remotely located, such as in controlled-environment facility communications provider data center 140 in whole (such as with respect to facility 110) or in part (such as with respect to facility 120). Controlled-environment facility communications provider data center 140, and hence external centralized communication processing system 141, may be connected to such facilities via a public network (e.g. the Internet) or a private network, or the like (e.g. via a secure tunneling protocol over the internet, using encapsulation) (150) and may provide communication services to such multiple controlled-environment facilities. More generally, however, it should be noted that communication systems 121, 131, 141, etc. may assume a variety of forms, comprising, including and/or embodying telephony switches, such as electronic switching systems, or the like, and/or may be configured to serve a variety of facilities and/or users, whether within, or outside of, the respective controlled-environment facility.

In some implementations, wherein the controlled-environment communication system (121, 131) is located within the controlled-environment facility (120, 130), it may have direct access to an Administration Management System (AMS) 122, 132 (or a Jail Management System (JMS) in correctional environment embodiments) for garnering information used in accordance with various embodiments of the present systems and methods. In other embodiments where the (central) controlled-environment facility communication system (141) is located remotely with respect to the controlled-environment facility (110, 120, etc.), access to AMS (or JMS) 112, 122, etc. may (also) be obtained via a computer network such as, for example, network 150, for gathering information used in accordance with various embodiments of the present systems and methods. Additionally, or alternatively, in other embodiments where a (central) controlled-environment facility communication system (141) is employed, a central AMS (142) disposed in controlled-environment facility communications provider data center 140, as part of or in conjunction with controlled-environment facility communication system 141, may be employed.

In the context of a correctional facility, the respective JMS or AMS databases may also include information such as balances for inmate trust and calling accounts; trial schedule; conviction data; criminal record; sentencing data, time served, time remaining to be served, and release date; cell and cellmate assignments; inmate restrictions and warnings; commissary order history; telephone call history; call recordings; known or suspected gang or criminal affiliations; known or suspected affiliates, accomplices, or gang members; and any other information that may be relevant or useful to correctional facility staff to house and maintain inmates.

In some embodiments, the lives of resident/inmates may be electronically managed from intake/booking through release. An AMS (or JMS) deployed in conjunction with one or more correctional facilities provides management of various aspects thereof, such as facility management (including tracking inmates from booking through release), staff management (including time and attendance management and personnel dispatching), call management (including placing and blocking calls, accounting for call charges, distance, commerce, determining credit worthiness of individuals, establishing and maintaining accounts, and handling purchases of goods and services), and inmate/resident management (including managing inmate information and tracking inmate activity).

In addition to providing certain visitation and communication operations, communication processing systems 121, 131, 141, etc. and/or AMS (or JMS) 112, 122, 132, 142, etc. may attempt to ensure that a resident's calls, video conferences, online chats, etc. are performed only with non-residents whose identities, devices, email addresses, phone numbers, etc. are listed in that resident's Personal Allowed Number (PAN) or Pre-Approved Contact (PAC) list. Each resident's PAN or PAC list may be stored, for example, in a database maintained by respective AMS (or JMS) 112, 122 or 132, 142, or the like. In addition to PAN or PAC list(s), AMS (or JMS) 112, 122 or 132, 142 (databases), or the like, may also store inmate or resident profile data (RPD), as well as visitation rules applicable to each inmate or resident, Communication Detail Records (CDRs), or similar records for resident phone calls, video visitations, texts, online chats, or the like.

Residents may use more-or-less conventional telephones 113, 123, 133, or the like to access certain communication services, under control of respective communication processing system 121, 131, 141, etc. In accordance with embodiments of the present systems and methods more-or-less conventional telephones 113, 123, 133 may be camera-enabled, or otherwise associated with controlled-environment facility cameras, or the like. Additionally, or alternatively, in some facilities a resident may use an intelligent controlled-environment facility media and/or communications terminal 114*a* through 114*n*, 124*a* through 124*n*, 134*a* through 134*n*, or the like, to place voice calls, as well as for video visitation, under control of respective communication processing system 121, 131, 141, etc. Such an intelligent controlled-environment facility media and/or communications terminal may be referred to as an Intelligent Facility Device (IFD) (114, 124, 134), which may be a video phone particularly adapted for use in a controlled-environment facility, but which may be used to place voice calls, as well. Alternatively, or additionally, IFDs may take the form of, or be used as, a voice phone that may have a touchscreen interface. Generally speaking, IFDs may be disposed in a visitation room, in a pod, as part of a kiosk, etc. Additionally, or alternatively, in some facilities, residents may also use a personal computer wireless device, such as a tablet computing device 115, 125, 135, smartphone/media player 116, 126, 136, or the like, which may have been adapted and/or approved for use in a controlled-environment facility. Such a tablet computing device or smartphone/media player may be referred to as an intelligent personal controlled-environment facility resident media and/or communications device, Intelligent Resident Device (IRD), or the like, and in a correctional institution embodiment, as an intelligent inmate media and/or communications device Intelligent Inmate Device (IID), or the like. As will be appreciated, IRDs, IFDs, or other similar devices, as well as phones 113, 123, 133, etc. have communications capabilities, to enable a party to participate in telephone calls, visitation sessions (including video calls), or the like with other call parties, such as non-residents, under control of respective communication processing system 121, 131, 141, etc.

In some embodiments, IFDs 114, 124, 134, etc. may be implemented as a computer-based system. For example, each of IFD may include a display, camera, and handset. The display may be any suitable electronic display such as, for example, a Liquid Crystal Display (LCD), a touchscreen display (e.g., resistive, capacitive, etc.), or the like, whereas the camera may be any suitable imaging device such as, for instance, a video camera or webcam equipped with Charge-Coupled Devices (CCDs), Complementary Metal-Oxide-Semiconductor (CMOS) active pixel sensors, etc. A handset may be similar to a traditional telephone handset including an earpiece portion (with a loudspeaker), a handle portion, and a mouthpiece portion (with a microphone). During a video visitation session, IFDs may be configured to capture a video image of a resident to be transmitted to a non-resident using the camera, and to display a video image of the non-resident to the resident using the display. IFDs may also be configured to capture an audio signal from the resident to be transmitted to a non-resident using the mouthpiece portion of the handset during video visitation call or during a voice call. Complementarily, the IFD may provide an audio signal from the non-resident to the resident using the earpiece portion of the handset during such calls. Additionally, or alternatively, audio received from the non-resident may be reproduced via a loudspeaker, and audio provided by the resident may be captured via a microphone.

Figure 1B:
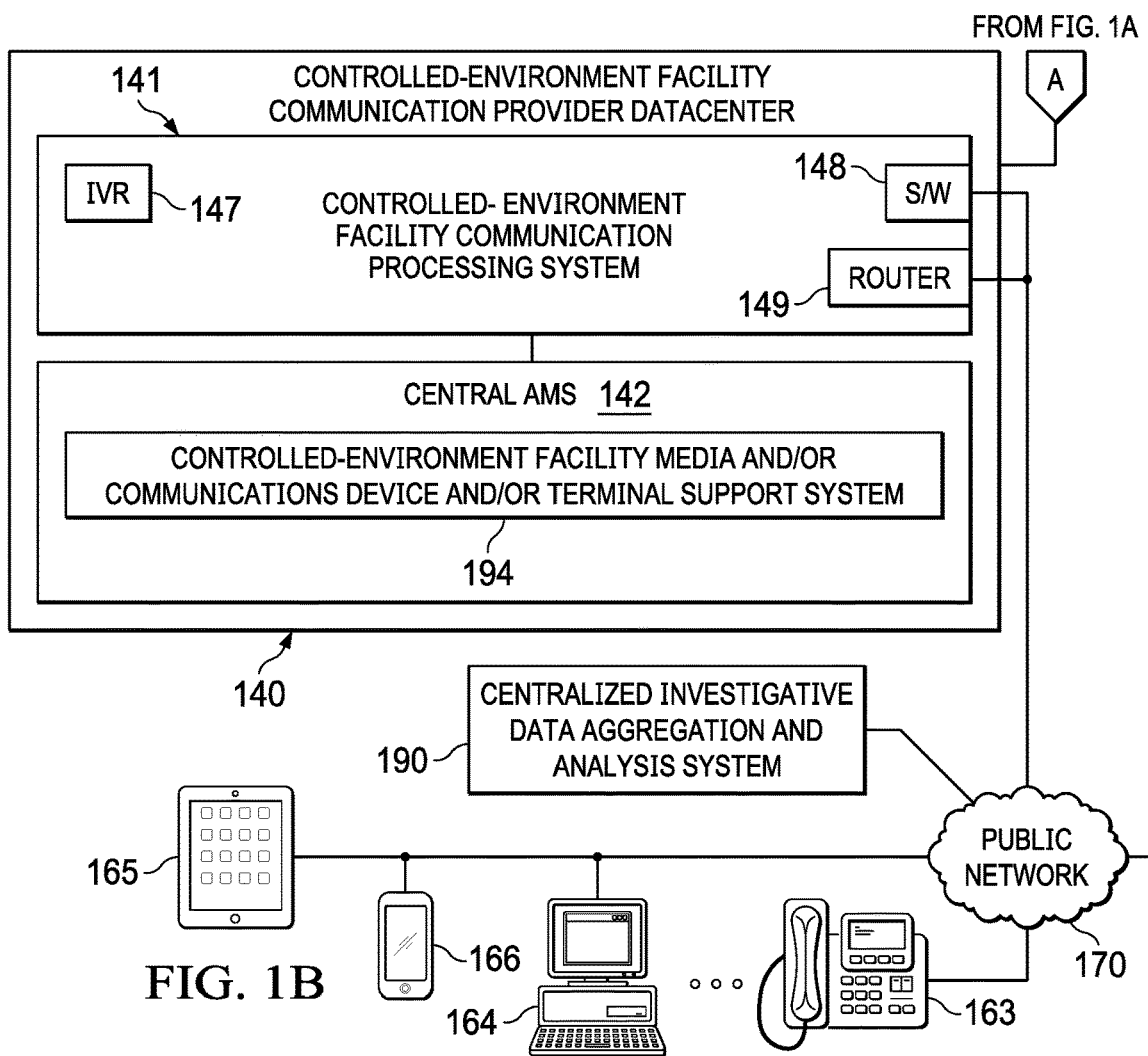

IFDs may be a replacement for typical telephones provided in controlled-environment facilities, such as rehabilitation centers, jails and prisons, utilizing existing facility telephony wiring. While the IFDs are generally illustrated in FIG. 1 as hardened, wall-mounted devices, IFDs may also take the form of a kiosk-type terminal or the like. In some cases, IFDs may assume the form of any computer, tablet computer, smart phone, etc., or any other consumer device or appliance with audio and/or video conferencing capabilities. For example, in a correctional facility environment a tablet computing device may be mounted on a wall, in a hardened case as an IFD. IFDs may replace a typical pay phone found in some facilities and may provide touch screen computer functionality that enables a resident to perform "self-service" tasks such as setting up doctor appointments, scheduling visitation, viewing schedules, checking the status of his or her case and/or requesting other controlled-environment facility services. The intelligent facility device may include an RFID or biometric reader, or the like to enable identification of each resident. In addition, the intelligent facility device includes, as noted, a built-in camera and telephone handset to enable a resident to use video conferencing to meet face to face with attorneys, family and friends. In accordance with embodiments of the present systems and methods, IFDs 114, 124, 134, etc. may be employed to facilitate implementation of embodiments of the present systems and methods, and/or to carry out all or certain aspects of embodiments of the present systems and methods.

As noted, IRDs 115, 125, 135, etc. may be tablet computing devices or smartphone/media players 116, 126, 136, etc. adapted and/or approved for use by residents of the respective controlled-environment facility (within the controlled-environment facility) 110, 120, 130, etc. Each IRD may be particularly adapted for use in a controlled-environment. For example, such an IRD may be "stripped-down," particularly from the standpoint of what application programs (apps are provided or allowed on the IRD) and/or connectivity afforded to the IRD. By way of example, such an IRD may employ an operating system kernel that has been rebuilt for use in such a tablet computing device in a controlled-environment facility. As a further example, such an IRD may be adapted to only connect to a network provided by the controlled-environment facility, and/or in only certain locations, within the controlled-environment facility, such as may be controlled by availability of Wi-Fi access, or the like, only being available in certain areas, as discussed above. That is, for example, where access may be compartmentalized, leveraging the structure of the controlled-environment facility, for example limiting the availability of a Wi-Fi signal providing the stream through the placement of wireless access points, antenna directionality of such wireless access points, and/or the like. Also, the IRD may have a few fixed apps pre-installed on the device, and installation of further apps on the device may be forbidden (i.e. prevented by modifications to the device's operating system, or the like) and/or restricted, such as by requiring permission from a facility administrator, or the like. Apps provided on an IRD might include apps of particular interest to residents of the controlled-environment facility. For example, an IRD provided to inmates of correctional facilities, might include apps that may be of particular use to an inmate, in general, such as access to a legal research service, or of more specific interest, such as providing an inmate nearing release, access to employment searching apps or the like. Hence, such IRDs may be used to help soon to be released inmates' transition. For example, the IRD may be used to communicate with a future employer, or the like. As such, IRDs may be sponsored, or otherwise subsidized by organizations or companies, assisting with the transition of inmates into society. As noted, in accordance with embodiments of the present systems and methods, IRDs may be used to communicate with others, such as through phone calls, video calls, or the like.

For a resident to initiate an outgoing communication, the resident may initiate telephone services by lifting the receiver on telephone 113, 123, 133, etc. or IFD 114, 124, 134, etc. and/or otherwise initiating a call, such as by launching an app on IRD 115, 125, 135, 116, 126, 136, etc. At which time, the resident may be prompted to provide a PIN, other identifying information or biometrics. In accordance with embodiments of the present systems and methods such biometric data may include the voice of the resident, an image of the resident, or the like. Interactive voice response (IVR) unit 127, 137 or 147, which may be integrated into communications processing system 121, 131 and/or 141, as illustrated, may generate and play a prompt or other messages to the resident. Under the control of communication processing system 121, 131 and/or 141, etc. the device may be capable of connecting with a non-resident's device (e.g. telephone 163, non-resident computer 164, non-resident tablet computing device 165, non-resident smartphone/media player 166, or the like) across public network 170, such as a publicly switched telephone network (PSTN), an Integrated Services Digital Network (ISDN), Voice-over-IP (VOIP) or packet data network, such as for example the Internet, etc. Network 170 may be the same, or a different network, as network 150. Telephony switches 128, 138, 148 etc. in respective communication processing system 121, 131, 141, etc. may be used to connect calls across a PSTN (i.e. network 170), such as calls from controlled-environment facility telephone 113, 123 or 133 and non-resident telephone 163, which, in accordance with embodiments of the present systems and methods, may also be camera-enabled. Telephony router 129, 139, 149, etc., media gateway functionality, or the like of respective communication system 121, 131, 141, etc. may be used to route data packets associated with a digital call connection, via an Integrated Services Digital Network (ISDN), the Internet, or the like (i.e. network 170). For example, a non-resident party may have a personal or laptop computer 164 with a webcam, or the like, or devices 165 or 166 may have an integrated camera and display (e.g., a smart phone, tablet, etc.). A network connection between the parties may be established and supported by an organization or commercial service that provides computer services and software for use in telecommunications and/or VoIP, such as SKYPE®. Additionally, or alternatively, the correctional facility and/or the destination may use videoconferencing equipment compatible with ITU H.323, H.320, H.264, and/or V.80, or other suitable standards. In accordance with various embodiments of the present systems and methods, non-resident's devices, telephone 163, non-resident computer 164, non-resident tablet computing device 165, non-resident smartphone/media player 166, and/or the like, may be disposed in the non-resident's home, place of work, on their person, or the like. Additionally, or alternatively the non-resident devices may be disposed in a visitation area of controlled-environment facility 110, 120, 130, etc., which may be within, adjacent to, or remote with respect controlled-environment facility 110, 120, 130, etc., itself.

Centralized investigative data aggregation and analysis system 190 may provide investigative tools. Such investigative tools may provide collection, processing, analysis, and/or reporting of information for intelligence purposes. In some embodiments, the investigative tools may provide functions such as entity linkage analysis, communication statistics, organization analysis, communication behavior analysis, subscription usage analysis, common communication analysis, timelines, correlations, mapping, word search, language translation (whether machine translation or access to translation services), call recording (whether terminated external to the controlled-environment facility or internally thereto), call notification, call monitoring (whether real-time or recorded, and whether monitoring a particular call or a plurality of calls), call "barging," call control, visitation monitoring/background checking, crime tip conduit, account activity monitoring (whether tracing deposits and expenditures of monies or monitoring account trends and behavior, such as velocity of transactions), multiple database querying, and resource integration, and/or the like. One or more of these investigative tools may be provided through an intuitive user interface to provide ease of use, facilitate operation across a variety of user terminals, and/or to facilitate remote access to one or more features thereof. For example, in some cases, a web-based portal enabling individuals to store and transmit information, including forensic tools that analyze communications into and out of controlled-environment facilities to assist law enforcement may be provided. Such a web page portal may have menus comprising an investigator dashboard, to present and facilitate execution of various investigative operations. These investigative tools may log calls (e.g., as CDRs), so that an investigator may research them through an archive and may be provided access to internal and/or external criminal databases and/or other sources of useful information.

Embodiments of the present artificial intelligence directed controlled-environment facility resident support ticket response and/or action systems and methods provide a way to assist controlled-environment facility residents with support based issues. To such ends, embodiments of the present systems and methods may employ at least one controlled-environment facility media and/or communications device and/or terminal support system 191, 192, 193, 194, which may, as illustrated be part of controlled-environment facility AMS 112, 122, 132, 142, or may be a standalone system, internal or external to one or more respective controlled-environment facilities 110, 120, 130, etc.

Controlled-environment facility communication processing systems 121, 131, 141, whether deployed in, or in conjunction with, a controlled-environment facility communications provider data center (140), or not, and/or working together (e.g. 141 and 121), or not, and/or a respective controlled-environment facility media and/or communications device and/or terminal support system 191, 192, 193, 194 of respective AMS or JMS 112, 122, 132, 142, may, each, or together, be referred to as a "controlled-environment facility media and/or communications device and/or terminal support platform," or the like.

Thereby, in accordance with embodiments of the present systems and methods, the controlled-environment facility media and/or communications device and/or terminal support platform may comprise one or more particularly adapted computer systems which each include at least one processor and a memory coupled to the at least one processor, such as discussed in greater detail below, with reference to FIG. 3. This memory may be configured to store program instructions executable by the at least one processor. Such program instructions may, upon execution by the at least one processor, cause the controlled-environment facility media and/or communications device and/or terminal support platform, to implement embodiments of the present systems and methods, such as in a manner described below, with respect to FIG. 2, a flowchart of example process 200 for artificial intelligence directed controlled-environment facility resident support ticket response and/or action, in accordance with some embodiments. Therein, at 202, a weight is assigned, or otherwise predetermined (or updated), such as in a controlled-environment facility media and/or communications device and/or terminal support platform, for one or more words that may appear in controlled-environment facility media and/or communications terminal and/or device support requests. These weights may be assigned by controlled-environment facility personnel, personnel of a controlled-environment facility service provider, or the like, and may be subsequently updated, or otherwise redefined in accordance with outcomes garnered in accordance with the present systems and methods. At 204, passages of predefined (canned) support request response text are prepared (or updated) and associated (e.g. tagged) with the one or more weighted words (keywords).

Embodiments of the present artificial intelligence directed controlled-environment facility resident support ticket response and/or action systems and methods provide logic to assist the controlled-environment facility resident based on device issue type, subtype, and/or by search. To wit, controlled-environment facility media and/or communications terminals and/or devices (114, 115, 116, 124, 125, 126, 134, 135,136), may, in accordance with embodiments of the present systems and methods, present a controlled-environment facility media and/or communications terminal or device support app, for access by a controlled-environment facility resident, at 206, such as via an icon, or other indicia displayed by each terminal/device. The present systems and methods allow a controlled-environment facility resident to log into a Kiosk or Tablet to submit support issues. Input of controlled-environment facility resident identification verification information, and validation of controlled-environment facility resident identification verification information, of a resident accessing a particular controlled-environment facility media and/or communications terminal or device (114, 115, 116, 124, 125, 126, 134, 135,136) may be required and accepted, at 208, prior to providing access to the controlled-environment facility media and/or communications terminal or device support app for input. Embodiments of the present artificial intelligence directed controlled-environment facility resident support ticket response and/or action systems and methods may capture information pertaining to controlled-environment facility resident specific Return Merchandise Authorization (RMA) number and/or device data to display to the controlled-environment facility resident upon login. such as warranty status, timeframe until warranty expiration, Operating System (OS) version, firmware version, memory usage (e.g., available and current), battery capacity (e.g., as percentage displaying life span, amount of charges until degradation (as a number), etc.), last sync (e.g., time and date), etc.

At 210, input of a support request is accepted from a controlled-environment facility resident accessing a particular controlled-environment facility media and/or communications terminal or device, via the controlled-environment facility media and/or communications terminal or device support app. This support request may be made with respect to the controlled-environment facility media and/or communications terminal or device that the resident is accessing to send the support request, or it may reference another controlled-environment facility media and/or communications device (or terminal). For example, a controlled-environment facility resident may access a controlled-environment facility media and/or communications terminal and use the controlled-environment facility media and/or communications terminal or device support app it provides to send a support request about a problem with that resident's personal controlled-environment facility media and/or resident communications device, such as in a case where the resident's personal controlled-environment facility media and/or resident communications device is inoperable, or the like. Input of the support request at 210 may be made via a search box, or the like, provided by the controlled-environment facility media and/or communications terminal or device support app, such as, upon the app being accessed by the resident. Alternatively, or additionally, input of the support request may be made and accepted via a chat bot box provided by the controlled-environment facility media and/or communications terminal or device support app, upon the app being accessed by the resident. Still further, the support request may be input as a result of the controlled-environment facility media and/or communications terminal or device support app presenting an option to the accessing resident to open a support ticket with respect to the controlled-environment facility media and/or communications terminal or device that the resident is accessing or with respect to another personal controlled-environment facility resident media and/or communications device, such as one associated with the resident (i.e. the resident's personal controlled-environment facility resident media and/or communications device). Upon selection to open a ticket the resident is (at some point) provided a text entry box to enter a text description of their device, software or other operation issue. Text boxes, such as search, chat or ticket support request entry boxes may have a character limit for input and/or character/text restrictions (i.e., no emojis, special characters, slang, etc.) In the event a ticket is opened after use of search and/or chat, text for the ticket support request may be, at least initially, auto-populated from text the resident has entered in the search and/or chat bot box(es). Embodiments of the present systems and methods may permit only a configurable number of tickets to be opened by a controlled-environment facility resident at a same time (e.g., limit to one ticket, per controlled-environment facility resident, at a time). To implement embodiments of the present artificial intelligence directed controlled-environment facility resident support ticket response and/or action, the present systems and methods may capture specific controlled-environment facility resident details to be used for ticket processes.

The support request is sent to a controlled-environment facility media and/or communications device and/or terminal support platform (191, 192, 193, 194), or the like, at 212. The support request is received by the controlled-environment facility media and/or communications device and/or terminal support platform/system, or the like, at 214. This controlled-environment facility media and/or communications device and/or terminal support platform/system, or the like, determines, at 216, the weight previously assigned (e.g., at 202) to words in the support request. Determining the previously assigned weight of one or more words in the support request at 216 may be carried out by passing the support request through an NLP and NLG algorithm of the controlled-environment facility media and/or communications device and/or terminal support platform/system, or the like. When the support request is made at 206 via search, such as by being input in a search box, the previously assigned weight of words in the search entered in the search box are determined at 216. Where input of the support request at 206 is made via a chat bot, the determination of the previously assigned weight of words in the support request at 216 is carried out on words entered in the chat bot box.

At 218 the controlled-environment facility media and/or communications device and/or terminal support platform/system, or the like, selects one or more passages of response text predefined and tagged at 204, to compose, or otherwise generate, a response to the support request, based, at least in part, on weight of words in the support request determined at 216 and one or more tags associated with the one or more words and the one or more passages of predefined text at 204. This selection of (a) passage(s) of predefined response text to generate, a response to the support request, based on weights of words in the support request and one or more tags associated with the words and the selected passages of predefined text may involve capturing tags of one or more words in the request and/or may be carried out by the NLP and NLG algorithm.

This response may then be personalized, by the controlled-environment facility media and/or communications device and/or terminal support platform/system, at 220, based, at least in part, on identification of the resident, such as may be required at 206. This personalization of the response may call for drawing (personal) information about the resident from a controlled-environment facility AMS (112, 122, 132, 142) using the identity (e.g. the identification verification credentials entered at 206) of the accessing resident. This information may include resident demographics such as (full) name, gender, geographic location (e.g. city, state, etc.), facility (and/or site within a facility), device or terminal type, device identification information, date of last login, date of last device update (e.g., device sync), housing unit location, device purchase (date and/or other information related to purchase of the device), etc. The personalization may, in accordance with embodiments of the present systems and methods, interject "manners," "courtesy," and/or the like into the response, such as at the direction of the NLP and NLG algorithm, such as through use of gender-based prefixes, expression of gratitude (e.g., "thank you"), etc.

At 222, a resulting personalized response, is sent by the controlled-environment facility media and/or communications device and/or terminal support platform/system, to the respective controlled-environment facility media and/or communications terminal or device (i.e., the controlled-environment facility media and/or communications terminal or device from which the support request was sent at 212).

Embodiments of the present systems and methods may (alternatively) provide a "direct message" presented during entry of the search, chat or ticket support request text at 210. Therein, the NLP and NLG algorithm, or the like may determine the weight previously assigned to words in the support request, similar to 216 above, as they are typed into the search, chat or ticket support request text box. Whereupon, similar to 218, one or more passages of predefined and tagged response text are selected to generate a response to the support request, based, at least in part, on weight of words in the support request and one or more tags associated with the one or more words and the one or more passages of predefined text. As at 220, this response may then be personalized, based, at least in part, on identification of the resident. The personalized response may then be sent to the resident, as a "pop-up message" during, or soon after, entry of the search, chat or ticket support request text to provide the direct message, in such embodiments.

Additionally, or alternatively, embodiments of the present systems and methods may also be employed for bulk messaging to address a known problem with a particular model or version of a personal controlled-environment facility resident media and/or communications device (or terminal), software, media (content), or the like. Therein, the NLP and NLG algorithm, or the like will generate a personalized message prepared to address the issue for each resident the message is sent to, based, at least in part, on identification of each resident, prior to the messages being sent, similar to 220, above. The personalized responses may then be sent to the residents, as direct pop-up messages, or the like, in some such embodiments.

In light of the forgoing, implementation of embodiments of the present systems and methods for artificial intelligence directed controlled-environment facility resident support ticket response and/or action improves controlled-environment facility service provider operational efficiencies across channels in support of tickets submitted by residents. The present systems and methods improve service levels, resident experience, analytics, and self-help, while reducing ticket submission counts, log in count, stress and workload of the resident support agent team.

To wit, embodiments of the present systems and methods may take in ticket text (and/or subject) (at 210 through 214) and drill down into the issue (at 216) and propose a proper response (at 218 and 220). Whereupon, embodiments of the present systems and methods may review the response, such as via feed-back loop to have the AI Engine confirm the correct response (such as may be as resolved by a resident support agent). These embodiments of the present systems and methods may then use that proper response to incorporate (at 202 and 204) better association the next time the calculated weight on inmate text requires the same response. Thusly, embodiments of the present systems and methods will eventually be more accurate by assessing shortfalls in determining the correct answer. In addition, embodiments of the present systems and methods begin to recognize if certain requests are changing from expected to include new features or functional issues, and may in accordance with some embodiments, notify an administrator of new subjects or drill downs for new issues based on the historical learned attributes of common requests compared to new words or issues that may appear and how often such new words or issues appear.

Embodiments of the present systems and methods for artificial intelligence directed controlled-environment facility resident support ticket response and/or action, as described herein, may be implemented at least in part as, or executed, at least in part, by one or more computer systems. One such computer system is illustrated in FIG. 3. In various embodiments, computer system 300 may be a server, a mainframe computer system, a workstation, a network computer, a desktop computer, a laptop, a tablet computing device, media player, or the like. For example, in some cases, computer 300 may implement one or more steps of example process 200 described above with respect to FIG. 2, and/or a computer system such as computer system 300 may be used as, or as part of, one or more of: AMSs 112, 122, 132 and/or 142; controlled environment facility communications management systems 121, 131 and/or 141; centralized investigative data aggregation and analysis system 190; controlled-environment facility media and/or communications device and/or terminal support system 191, 192, 193 and/or 194; controlled-environment facility resident communications devices 113 through 116, 123 through 126, and 133 through 136; non-resident communications devices 163 through 166; and/or the like. In various embodiments two or more of these computer systems may be configured to communicate with each other in any suitable way, such as, for example, via public network 170, which may be the Internet, or the like, as discussed above, via a local area network using wired or wireless functionality.

As illustrated, computer system 300 includes one or more processors 310A-N coupled to a system memory 320 via bus 330. Computer system 300 further includes a network interface 340 coupled to bus 330, and one or more I/O controllers 350, which in turn are coupled to peripheral devices such as cursor control device 360, keyboard 370, display(s) 380, etc. Each of I/O devices 360, 370, 380 may be capable of communicating with I/O controllers 350, for example, via a wired connection (e.g., serial port, Universal Serial Bus port) or wireless connection (e.g., Wi-Fi, Bluetooth, Near Field Communications Link, etc.). Other devices may include, for example, microphones, antennas/wireless transducers, phone detection modules, etc.

In various embodiments, computer system 300 may be a single-processor system including one processor 310A, or a multi-processor system including two or more processors 310A-N (e.g., two, four, eight, or another suitable number). Processors 310 may be any processor capable of executing program instructions. For example, in various embodiments, processors 310 may be general-purpose or embedded processors implementing any of a variety of instruction set architectures (ISAs), such as the x86, PowerPC®, ARM®, SPARC®, or MIPS® ISAs, or any other suitable ISA. In multi-processor systems, each of processors 310 may commonly, but not necessarily, implement the same ISA. Also, in some embodiments, at least one processor 310 may be a graphics processing unit (GPU) or another dedicated graphics-rendering device.

System memory 320 may be configured to store program instructions and/or data accessible by processor 310. In various embodiments, system memory 320 may be implemented using any suitable memory technology, such as static random-access memory (SRAM), synchronous dynamic RAM (SDRAM), nonvolatile/Flash-type memory, or any other type of memory. As illustrated, program instructions and data implementing certain operations and modules such as those described herein may be stored within system memory 320 as program instructions 325 and data storage 335, respectively. In other embodiments, program instructions and/or data may be received, sent, or stored upon different types of computer-accessible media or on similar media separate from system memory 320 or computer system 300.

A computer-accessible medium may include any tangible and/or non-transitory storage media or memory media such as electronic, magnetic, or optical media—e.g., disk or CD/DVD-ROM coupled to computer system 300 via bus 330. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory.

For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, bus 330 may be configured to coordinate I/O traffic between processor 310, system memory 320, and any peripheral devices in the computer system, including network interface 340 or other peripheral interfaces, such as I/O devices 360, 370, 380. In some embodiments, bus 330 may perform any necessary protocol, timing, or other data transformations to convert data signals from one component (e.g., system memory 320) into a format suitable for use by another component (e.g., processor 310). In some embodiments, bus 330 may include support for devices attached through various types of peripheral buses, such as a variant of the Peripheral Component Interconnect (PCI) bus standard or the Universal Serial Bus (USB) standard, for example. In some embodiments, the function of bus 330 may be split into two or more separate components, such as a northbridge chipset and a southbridge chipset, for example. In addition, in some embodiments some or all the functionality of bus 330, such as an interface to system memory 320, may be incorporated directly into processor(s) 310A-N.

Network interface 340 may be configured to allow data to be exchanged between computer system 300 and other devices attached to a network, such as other computer systems, or between nodes of computer system 300. In various embodiments, network interface 340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

I/O controllers 350 may, in some embodiments, enable communications with one or more display terminals, keyboards, keypads, touchpads, scanning devices, voice or optical recognition devices, mobile devices, or any other devices suitable for entering or retrieving data by one or more computer system 300. Multiple I/O controllers 350 may be present in computer system 300 or may be distributed on various nodes of computer system 300. In some embodiments, I/O devices may be separate from computer system 300 and may interact with one or more nodes of computer system 300 through a wired or wireless connection, such as over network interface 340.

As shown in FIG. 3, system memory 320 may include program instructions 325, configured to implement certain embodiments described herein, and data storage 335, comprising various data may be accessible by program instructions 325. In an embodiment, program instructions 325 may include software elements, which may be configured to affect the operations discussed in FIGS. 1 through 3. Program instructions 325 may be implemented in various embodiments using any desired programming language, scripting language, or combination of programming languages and/or scripting languages (e.g., C, C++, C #, Java™, JavaScript™, Perl, etc.). Data storage 335 may include data that may be used in these embodiments (e.g., recorded communications, profiles for different modes of operations, etc.). In other embodiments, other or different software elements and data may be included.

A person of ordinary skill in the art will appreciate that computer system 300 is merely illustrative and is not intended to limit the scope of the disclosure described herein. The computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

The various operations described herein, particularly in connection with FIGS. 1 through 3, may be implemented in software executed by processing circuitry, hardware, or a combination thereof. The order in which each operation of a given method is performed may be changed, and various operations may be added, reordered, combined, omitted, modified, etc. It is intended that embodiment(s) described herein embrace all such modifications and changes and, accordingly, the above description should be regarded in an illustrative rather than a restrictive sense.

A person of ordinary skill in the art will appreciate that computer system 300 is merely illustrative and is not intended to limit the scope of the disclosure described herein. The computer system and devices may include any combination of hardware or software that can perform the indicated operations. Additionally, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for artificial intelligence directed controlled-environment facility resident support ticket response and/or action, the system comprising:

one or more controlled-environment facility media and/or communications terminals and/or a plurality of personal controlled-environment facility resident media and/or communications devices, each comprising at least one processor and a memory coupled to the at least one processor and storing program instructions thereupon, which when executed by the at least one processor, cause the respective controlled-environment facility media and/or communications terminal or personal controlled-environment facility resident media and/or communications device to:
provide access to a controlled-environment facility media and/or communications terminal or device support application program; and
accept input of a controlled-environment facility media and/or communications terminal or device support request, via the controlled-environment facility media and/or communications terminal or device support application program, from a controlled-environment facility resident accessing the respective controlled-environment facility media and/or communications terminal or personal controlled-environment facility resident media and/or communications device;
a controlled-environment facility media and/or communications device services platform comprising at least one processor and a memory coupled to the at least one processor and storing program instructions thereupon, which when executed by the at least one processor, cause the controlled-environment facility media and/or communications device services platform to:
train a machine learning natural language process model for controlled-environment facility resident support request response and/or action, employing examples of text comprising words, sentences, and paragraphs written by humans, to understand context of written text in the controlled-environment facility media and/or communications terminal or device support request;
receive the support request;
automatically direct the machine learning natural language process model to implement one or more phases of lexical analysis, parsing, semantic analysis, discourse integration, and pragmatic analysis to implement at least natural language process text-analytics including one or more of entity recognition, concept extraction, text classification, sentiment analysis, and relation extraction or parsing applied to text in the support request, to determine context of the text in the support request;
automatically direct the machine learning natural language process model to pass the support request through the machine learning natural language process model to determine a previously assigned weight of one or more words in the support request, employing the machine learning natural language process model determined context of text in the support request;
automatically direct the machine learning natural language process model to select one or more passages of predefined response text to compose text for a response to the support request, based, at least in part, on the machine learning natural language process model determined context of the support request, the machine learning natural language process model determined previously assigned weight of one or more words in the support request and one or more tags associated with the one or more words and the one or more passages of predefined text that observe rules of grammar;
automatically direct an artificial intelligence engine to, via a feedback loop, reiteratively review the response to confirm a correct response; and
automatically update the previously assigned weight to one or more words from the support request, based, at least in part, on whether the artificial intelligence engine reiterative review of the response confirms the response as the correct response; and
automatically update selected one or more passages of predefined response text and/or the one or more tags associated with the one or more words and the one or more passages of predefined text, based, at least in part, on whether the artificial intelligence engine reiterative review of the response confirms the response as the correct response;
automatically direct the machine learning natural language process model to personalize, using the machine learning natural language process model determined context of text of the support request, the response, based, at least in part, on identification of a resident; and
automatically send a resulting personalized response to the respective controlled-environment facility media and/or communications terminal or personal controlled-environment facility resident media and/or communications device.

2. The system of claim 1, wherein the support request is for the respective controlled-environment facility media and/or communications terminal or personal controlled-environment facility resident media and/or communications device that the resident is accessing or another controlled-environment facility media and/or communications terminal or personal controlled-environment facility resident media and/or communications device.

3. The system of claim 1, wherein the program instructions of the respective controlled-environment facility media and/or communications terminal or personal controlled-environment facility resident media and/or communications device, or the program instructions of the controlled-environment facility media and/or communications device services platform, upon execution by a respective processor, cause the respective controlled-environment facility media and/or communications terminal or personal controlled-environment facility resident media and/or communications device, or cause the controlled-environment facility media and/or communications device services platform to accept input of the support request by presenting, via the controlled-environment facility media and/or communications terminal or device support application program, a search box, and wherein determining the previously assigned weight of one or more words in the support request is carried out on words entered in the search box.

4. The system of claim 1, wherein the program instructions of the respective controlled-environment facility media and/or communications terminal or personal controlled-environment facility resident media and/or communications devices, or the program instructions of the controlled-environment facility media and/or communications device services platform, upon execution by a respective processor, cause the respective controlled-environment facility media and/or communications terminal or personal controlled-environment facility resident media and/or communications device, or cause the controlled-environment facility media and/or communications device services platform to accept input of the support request by presenting, via the controlled-environment facility media and/or communications terminal or device support application program, a chat bot box, and wherein determining the previously assigned weight of one or more words in the support request is carried out on words entered in the chat bot box.

5. The system of claim 1, wherein the program instructions of the respective controlled-environment facility media and/or communications terminal or personal controlled-environment facility resident media and/or communications devices, or the program instructions of the controlled-environment facility media and/or communications device services platform, upon execution by a respective processor, cause the respective controlled-environment facility media and/or communications terminal or personal controlled-environment facility resident media and/or communications device, or cause the controlled-environment facility media and/or communications device services platform to accept input of the support request by first presenting, via the controlled-environment facility media and/or communications terminal or device support application program, an option to open a support ticket with respect to the respective controlled-environment facility media and/or communications terminal or personal controlled-environment facility resident media and/or communications device that the resident is accessing or an other personal controlled-environment facility resident media and/or communications device associated with the resident.

6. The system of claim 1, wherein the program instructions of the controlled-environment facility media and/or communications device services platform include a machine learning natural language process and natural language generation algorithm, and wherein the program instructions of the controlled-environment facility media and/or communications device services platform, upon execution by the processor, cause the controlled-environment facility media and/or communications device services platform to determine the previously assigned weight of one or more words in the support request by receiving and passing the text in the support request through the natural language process and natural language generation algorithm.

7. The system of claim 1, wherein the program instructions of the controlled-environment facility media and/or communications device services platform include a machine learning natural language process and natural language generation algorithm, and wherein the program instructions of the controlled-environment facility media and/or communications device services platform, upon execution by the processor, cause the controlled-environment facility media and/or communications device services platform to personalize the response by passing the response through the natural language process and natural language generation algorithm.

8. The system of claim 7, wherein the program instructions of the controlled-environment facility media and/or communications device services platform, upon execution by the processor, cause the controlled-environment facility media and/or communications device services platform to personalize the response based, at least in part, on identification of the resident by the natural language process and natural language generation algorithm drawing information about the resident from a controlled-environment facility administration and management system using the identification.

9. A method for artificial intelligence directed controlled-environment facility resident support ticket response and/or action comprising:
provide, via a controlled-environment facility media and/or communications terminal or device, access to a controlled-environment facility media and/or communications terminal or device support application program;
accepting input of a controlled-environment facility media and/or communications terminal or device support request, via the controlled-environment facility media and/or communications terminal or device support application program, from a controlled-environment facility resident accessing the controlled-environment facility media and/or communications terminal or device;
training, by a controlled-environment facility media and/or communications device services platform, a machine learning natural language process model for controlled-environment facility resident support request response and/or action, employing examples of text comprising words, sentences, and paragraphs written by humans, to understand context of written text in the controlled-environment facility media and/or communications terminal or device;
receiving the support request, by the controlled-environment facility media and/or communications device services platform;
automatically directing, by the controlled-environment facility media and/or communications device services platform, the machine learning natural language process model to implement one or more phases of lexical analysis, parsing, semantic analysis, discourse integration, and pragmatic analysis to implement at least natural language processing text-analytics including one or more of entity recognition, concept extraction, text classification, sentiment analysis, and relation extraction or parsing applied to text in the support request, to determine context of the text in the support request;
automatically directing, by the controlled-environment facility media and/or communications device services platform, the machine learning natural language process model to pass the support request through the machine learning natural language process model to determine a previously assigned weight of one or more words in the support request, employing the machine learning natural language process model determined context of text of the support request;
automatically directing, by the controlled-environment facility media and/or communications device services platform, the machine learning natural language process model to select based, at least in part, on the machine learning natural language process model determined previously assigned weight of one or more words in the support request, one or more passages of predefined response text associated with one or more tags associated with the one or more words, composing a response to the support request that observe rules of grammar;
automatically directing, by the controlled-environment facility media and/or communications device services platform, an artificial intelligence engine to, via a feedback loop, reiteratively review the response to confirm a correct response; and automatically updating, by the artificial intelligence engine, the previously assigned weight to one or more words from the support request, based, at least in part, on whether the artificial intelligence engine reiterative review of the response confirms the response as the correct response; and/or automatically updating, by the artificial intelligence engine, selected one or more passages of predefined response text and/or the one or more tags associated with the one or more words and the one or more passages of predefined text, based, at least in part, on whether the artificial intelligence engine reiterative review of the response confirms the response as the correct response;

automatically directing, by the controlled-environment facility media and/or communications device services platform, the machine learning natural language process model to personalize the response, using the machine learning natural language process model determined context of text of the support request, based, at least in part, on identification of a resident; and sending a resulting personalized response, by the controlled-environment facility media and/or communications device services platform, to the controlled-environment facility media and/or communications terminal or device.

10. The method of claim 9, wherein the support request is for the controlled-environment facility media and/or communications terminal or device that the resident is accessing or another controlled-environment facility media and/or communications terminal or device.

11. The method of claim 9, wherein accepting input of the support request further comprises presenting, via the controlled-environment facility media and/or communications terminal or device support application program, a search box, and wherein determining the previously assigned weight of one or more words in the support request is carried out on words entered in the search box.

12. The method of claim 9, wherein accepting input of the support request further comprises presenting, via the controlled-environment facility media and/or communications terminal or device support application program, a chat bot box, and wherein determining the previously assigned weight of one or more words in the support request is carried out on words entered in the chat bot box.

13. The method of claim 9, wherein accepting input of the support request further comprises presenting, via the controlled-environment facility media and/or communications terminal or device support application program, an option to open a support ticket with respect to the controlled-environment facility media and/or communications terminal or device that the resident is accessing or an other personal controlled-environment facility resident media and/or communications device associated with the resident.

14. The method of claim 9, wherein determining the previously assigned weight of one or more words in the support request using machine learning further comprises receiving and passing the support request through a natural language process and natural language generation algorithm.

15. The method of claim 9, wherein personalizing the response using machine learning further comprises passing the response through a natural language process and natural language generation algorithm.

16. The method of claim 15, wherein personalizing the response, using machine learning, based, at least in part, on identification of the resident further comprises the natural language process and natural language generation algorithm drawing information about the resident from a controlled-environment facility administration and management system using the identification.

17. A computer readable non-transitory medium having program instructions stored thereon that, upon execution by a controlled-environment facility media and/or communications device services platform, cause the controlled-environment facility media and/or communications device services platform to:

accept input of a controlled-environment facility media and/or communications terminal or device support request, provided via a controlled-environment facility media and/or communications terminal or device support application program on a controlled-environment facility media and/or communications terminal or device, from a controlled-environment facility resident accessing the controlled-environment facility media and/or communications terminal or device;

train a machine learning natural language process model for controlled-environment facility resident support request response and/or action, employing examples of text comprising words, sentences, and paragraphs written by humans, to understand context of written text in the controlled-environment facility media and/or communications terminal or device support request;

receive the support request;

automatically direct the machine learning natural language process model to implement one or more phases of lexical analysis, parsing, semantic analysis, discourse integration, and pragmatic analysis to implement at least natural language process text-analytics including one or more of entity recognition, concept extraction, text classification, sentiment analysis, and relation extraction or parsing, applied to text in the support request, context of the text in the support request, to determine a context of text in the support request;

automatically direct the machine learning natural language process model to pass the support request through the machine learning natural language process model to use the machine learning natural language process model determined context of text in the support request to determine a previously assigned weight of one or more words in the support request;

automatically direct the machine learning natural language process model to select one or more passages of predefined response text to compose text for a response to the support request, based, at least in part, on the machine learning natural language process model determined previously assigned weight of one or more words in the support request and one or more tags associated with the one or more words and the one or more passages of predefined response text that observe rules of grammar;

automatically direct an artificial intelligence engine, via a feed-back loop, reiteratively review the response to confirm a correct response; and automatically update the previously assigned weight to one or more words from the support request, based, at least in part, on whether the artificial intelligence engine reiterative review of the response confirms the response as the correct response; and/or automatically update selected one or more passages of predefined response text and/or the one or more tags associated with the one or more words and the one or more passages of predefined text, based, at least in part, on whether the artificial intelligence engine reiterative review of the response confirms the response as the correct response;

automatically direct the machine learning natural language process model determined context of text in the support request to personalize the response, based, at least in part, on identification of a resident; and automatically send a resulting personalized response to the controlled-environment facility media and/or communications terminal or device.

18. The computer readable non-transitory medium of claim 17, wherein the program instructions include a natural language process and natural language generation algorithm, and wherein, upon execution by a controlled-environment facility media and/or communications device services platform, the program instructions cause the controlled-environment facility media and/or communications device services platform to:

determine the previously assigned weight of one or more words in the support request, using machine learning, by receiving and passing the support request through the natural language process and natural language generation algorithm; and personalize the response, using machine learning, by passing the response through the natural language process and natural language generation algorithm.

* * * * *